Patented Oct. 18, 1927.

1,645,974

UNITED STATES PATENT OFFICE.

KARL SCHÖLLKOPF, OF OBERKASSEL, NEAR DUSSELDORF, GERMANY, ASSIGNOR TO RHEINISCHE KAMPFER-FABRIK GESELLSCHAFT MIT BESCHRÄNKTER HAFTUNG, OF OBERKASSEL, NEAR DUSSELDORF, GERMANY.

SUBSTITUTING HALOGEN.

No Drawing. Application filed August 16, 1923, Serial No. 657,816, and in Germany August 23, 1922.

The present invention refers to a process for substituting the halogen of aromatic sulphonic acids having halogens in the aromatic nucleus by means of hydrogen or of preparing the corresponding sulphonic acids therefrom. The process consists in subjecting the said compounds in the presence of suitable catalysts, capable of promoting the hydrogenation, to an alkaline medium in the presence of water at ordinary temperatures or to the action of hydrogen at higher than ordinary temperatures. The process may be carried out under atmospheric or under increased pressure, in the latter case the increased pressure may be caused by the hydrogen used for the purposes of the reaction. The process may be carried out between 20 and 300 degrees centigrade. Suitable catalysts are nickel, cobalt, copper, platinum, palladium. The said metals may be deposited in the colloidal state on inactive bodies in a fine state of division, for instance on kieselguhr (see Berichte der deutschen chemischen Gesellschaft vol. 44 (1911), page 1013) or on calcium carbonate (see Berichte der deutschen chemischen Gesellschaft vol. 49 (1916), page 1064).

The substitution of the halogen of aromatic sulphonic acids having halogens in the aromatic nucleus by catalytic hydrogen is surprising. Hitherto it had not been attempted to subject halogenized sulphonic acids to the action of catalytic hydrogen. It was thought that such substitution by catalytic hydrogen could not be effected in view of the presence of the sulphonic acids, as sulphur is supposed to interfere with any catalytic hydrogenation, as for instance, from the use of india rubber corks (see Berichte der deutschen chemischen Gesellschaft vol. 49 (1916), page 1070). From these reasons, it could not be predicted that halogen in halogenized aromatic sulphonic acids could be substituted by catalytic hydrogen, because it had been assumed that the sulphonic group would be attacked or reduced by the hydrogen with the simultaneous formation of sulphonic acids or mercaptans.

The process may be applied to aromatic sulphonic acids which contain one halogen or several halogen groups, and which contain further substituting groups, as for instance, alkyl, hydroxyl, nitro or amino groups. The alkaline reaction for the process may be obtained by the addition of alkalies, such as the hydroxides of the alkaline earth metals or the carbonates of the alkaline or alkaline earth metals. After the completion of the reduction, which is generally finished after several hours, if one works under increased pressure, the catalyst may be separated by filtration from the liquid. The salts of the sulphonic acids or the free sulphonic acids may be separated from the halides formed in any suitable manner.

The manner in which the process may be carried out may be illustrated by the following examples:

*Example 1.*—100 kilograms of p-brombenzol sodium sulphonate are thoroughly mixed with 30 kilograms of sodium carbonate and 1 kilogram nickel catalyst in 400 liters of water at 100 degrees centigrade and the mixture is subjected to the action of hydrogen at a pressure of 10 atmospheres, produced by the hydrogen introduced into the mixture which is placed in a suitable apparatus for carrying out chemical reactions under pressure, as for instance, an autoclave. After the absorption of hydrogen has been completed the contents of the autoclave in a warm state are filtered off from the catalyst. After the liquid has been cooled the larger part of the sodium salt of the benzol sulphonic acid formed is separated in crystals whereas the remaining part may be salted out by addition of sodium chloride.

*Example 2.*—100 kilograms of 2-chlor-p-cymol-3-sulphonic acid are mixed with 50 kilograms sodium hydroxide and 1 kilogram nickel catalyst and 400 liters of water and the mixture is subjected at 180 to 200 degrees centigrade to the action of hydrogen at a pressure of 30 atmospheres produced by the hydrogen, used for the process, during about 8 hours. After the completion of the reduction, the hot liquid is separated from the precipitate by filtration and the alkali is neutralized by means of carbonic acid or hydrochloric acid. By evaporating the liquid the sodium salt of the p-cymol-3-sulphonic acid is obtained.

*Example 3.*—100 kilograms 2 brom-p-cymol-3-sulphonic acid, 40 kilograms sodium hydroxide, 1 kilogram nickel catalyst in 400 liters of water are thoroughly agitated during 2 to 3 hours at 100 degrees centigrade under a pressure of 10 atmospheres produced by the hydrogen introduced into the mixture in an autoclave. The hot mixture is filtered off from the catalyst which may be used again for carrying on the process. The alkali is neutralized by means of carbonic acid or hydrochloric acid. On cooling the liquid one obtains the sodium salt of the p-cymol-3-sulphonic acid in the crystalline state. Further portions may be separated from the mother-liquor by means of sodium chloride.

*Example 4.*—100 kilograms 2-brom-p-cymol-3-sulphonic acid (or 2-chlor-p-cymol-3-sulphonic acid) are dissolved in about 600 liters water and 50 kilograms potassium hydroxide, 2 kilograms nickel catalyst (or platinum catalyst) are added and hydrogen during 2 to 3 days is introduced into the liquid at about 100 degrees centigrade, the mixture being thoroughly stirred until the formation of free halogen or halogen acid ceases. The potassium salt of para cymol-3-sulphonic acid is obtained as described in Example 3.

I claim:—

1. The process for substituting the halogen in halogenized aromatic sulphonic acids containing halogen in the aromatic nucleus by means of hydrogen which consists in subjecting an aqueous alkaline solution of the said compounds to the action of hydrogen and hydrogenating catalysts between 20 and 300 degrees centigrade.

2. The process for substituting the halogen in halogenized aromatic sulphonic acids containing halogen in the aromatic nucleus by means of hydrogen which consists in subjecting an aqueous alkaline solution of the said compounds to the action of hydrogen and hydrogenating catalysts under pressure between 20 and 300 degrees centigrade.

3. The process for substituting the halogen of 2-halogen-p-cymol-3-sulphonic acid by means of hydrogen which consists in subjecting an aqueous alkaline solution of the said compound to the action of hydrogen and hydrogenating catalysts under pressure at a temperature between 20 and 300 degrees centigrade.

In testimony whereof I hereunto affix my signature.

KARL SCHÖLLKOPF.